W. H. WAKFER.
DRILL.
APPLICATION FILED FEB. 14, 1914.
1,169,369.
Patented Jan. 25, 1916.
2 SHEETS—SHEET 1.
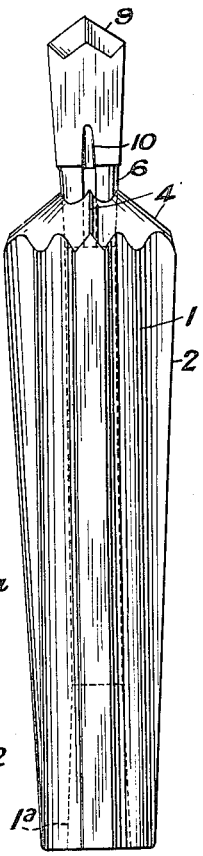
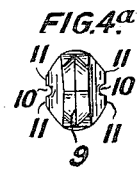
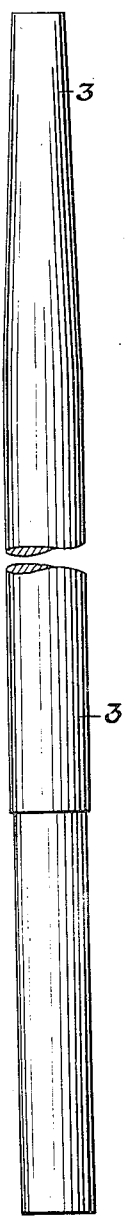
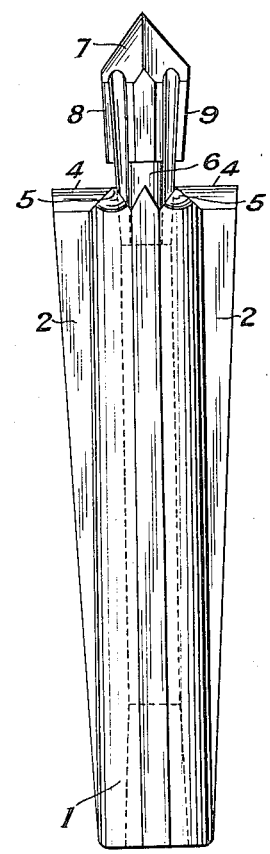
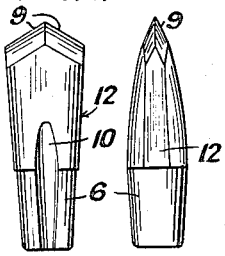
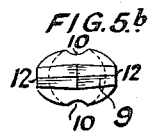
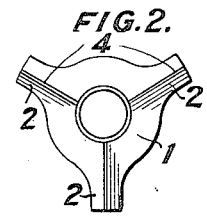
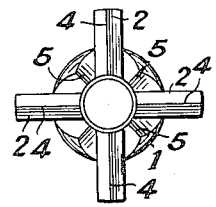
Witnesses:
B. Dommers
E. Leckert
Inventor.
William Henry Wakfer.
By [signature]
Atty

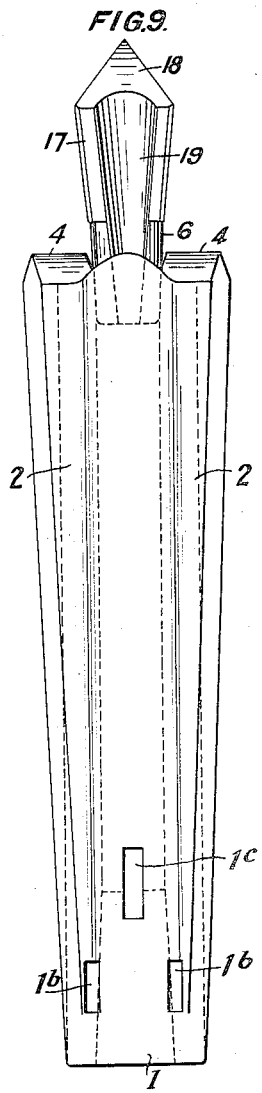
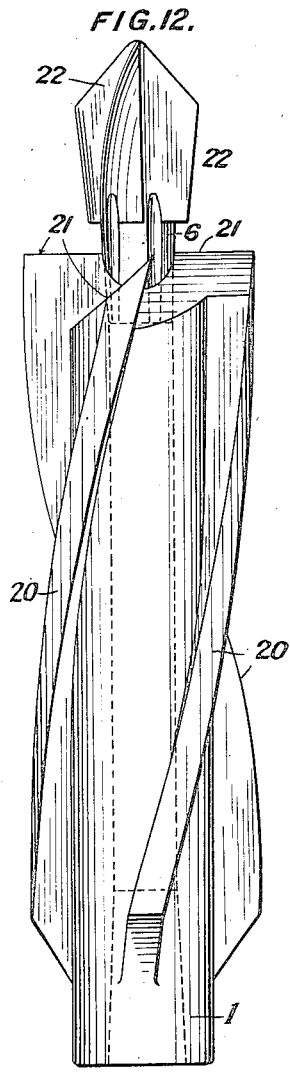
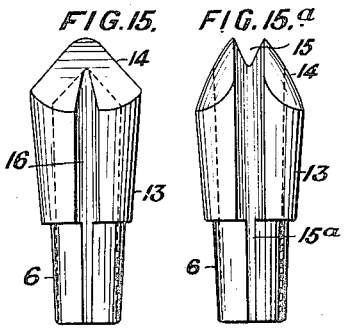
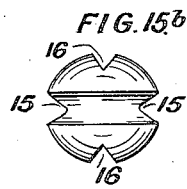
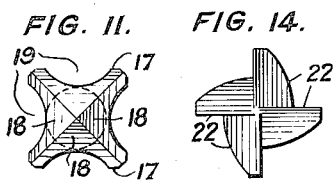
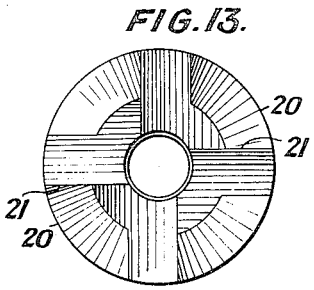

UNITED STATES PATENT OFFICE.

WILLIAM HENRY WAKFER, OF SOUTH NORWOOD, ENGLAND, ASSIGNOR OF ONE-HALF TO SAMUEL PECK, OF WALLINGTON, ENGLAND.

DRILL.

1,169,369.  Specification of Letters Patent.  Patented Jan. 25, 1916.

Application filed February 14, 1914. Serial No. 818,690.

*To all whom it may concern:*

Be it known that I, WILLIAM HENRY WAKFER, a subject of the King of Great Britain, and resident of 67 Whitworth road, South Norwood, in the county of Surrey, England, have invented new and useful Improvements in Drills, of which the following is a specification.

This invention comprises improvements in and relating to drills, bits and like appliances for boring in earth, rock and the like.

The invention has for its object to improve the cutting or boring capacity of these instruments, to lessen the cost of the upkeep of the tools of this character, and generally to increase the life and efficiency of such tools while at the same time reducing the labor involved in the manufacture and handling of them.

Breakages frequently occur, owing to the drills losing guidance when entering say a fissure in hard rock, or to other causes, the result being that the drills jump or get out of true alinement and become subjected to serious stresses, with consequent fractures which are rendered all the more possible by the employment of unsuitable steel, or imperfect tempering. Now, according to this invention, the cutting end of the boring head or bit is fitted with a center bit, or central guide point, which bit or point extends beyond the cutting end and is formed with cutting edges. The main boring head or bit may be of the winged or other cross section type, and may be readily attachable to and detachable from the tool bar. The head may be hollow for the whole of its length, and the tool bar also may be hollow if desired. With a winged head or bit of this nature the cutting edges would be produced by suitably forming the end faces of the wings or other suitable formations. Bits of so-called X-section or +-section may be used with advantage but heads or bits having any number of wings may be employed, or the bits may be of prismatic and pyramidal formation.

The invention will be described with reference to the accompanying drawings in which:—

Figure 1 shows in elevation one form of boring head having tapered side wings and a removable center bit in position thereon; Fig. 2 is a plan of Fig. 1 with the center bit removed; Fig. 3 shows a tool bar in elevation; Figs. 4 and 4ª are respectively a side elevation and plan of the center bit removed from the boring head; Fig. 5 shows in front elevation, Fig. 5ª in side elevation and Fig. 5ᵇ in plan a modified construction of the center bit; Figs. 6 and 7 are views corresponding to Figs. 1 and 2 of a modified construction and Fig. 8 is a plan of the center bit shown in Fig. 6; Figs. 9, 10, and 11 are views similar to Figs. 6, 7 and 8 respectively of a further modified construction; Figs. 12, 13 and 14 are also views similar to Figs. 6, 7 and 8 respectively of a still further modified construction in which the boring head and center bit are formed with helical wings; Figs. 15, 15ª and 15ᵇ are views corresponding to Figs. 5, 5ª and 5ᵇ respectively of a further modified construction of removable center bit.

A hollow tubular head 1 of say, nine inches in length may as shown in Figs. 1 and 2 be formed with three radial wings 2 arranged at equal distances apart around said head or the said head 1 may be formed with four wings 2 so angularly disposed as to produce the so-called +-section as shown in Figs. 6 and 7 or X-section as shown in Figs. 9 and 10 or other section. The wings 2 are tapered from one end of the head to the other so that the distance across from tip to tip of opposite wings may be, say, two inches and seven eighths at the cutting end and two inches, more or less, near the rear end. The bore of this hollow head 1 is preferably tapered at the rear end as at 1ª to receive the similarly tapered end 3 of the tool bar, see Fig. 3, or both may be threaded. The taper employed is preferably that known as the Morse taper. The wings 2 may as shown in Figs. 1, 6 and 9, merge into a tubular portion or socket at the rear end of the head 1. The cutting edges 4 of the tubular head 1, which edges may be inclined to the longitudinal axis as shown in Fig. 1 or perpendicular thereto as in Figs. 6 and 9 may be formed by grinding or otherwise fashioning the ends of the wings 2 and the portions of the head 1 forming radial continuations thereof to an approximate V-shape, and the upper end of the said head may be formed with V or other shaped cutting edges between the said wings 2 as at 5, Figs. 6 and 7. The center bit preferably consists of a tapered or conical shank 6 adapted to be driven into the front end of the bore of the head 1 and may have a three-sided pyramidal end 7 formed on the shank, or on a short prismatic portion 8, Fig. 6, the faces of which are preferably hollowed out, as shown. Longitudinal grooves 10, Figs. 1 and 5 may be formed in the shank 6 to permit fluid, air or steam to pass to the faces of the bit when a hollow tool bar is employed. In the constructions of center bit shown in Figs. 1, 4, and 4ª and Figs. 5, 5ª, 5ᵇ the end of the bit forward of the tapered shank 6 is so formed as to merge from circular cross section into a cross section of flat elliptical form, the dimension across the major diameter of which is greater than the largest diameter of the shank 6. The center bit is formed with V-shaped cutting edges 9, which are downwardly inclined from the axis of the bit thus providing two radial cutting edges and a central point to the cutting end.

The center bit shown in Figs. 1, 4 and 4ª differs only slightly from that shown in Figs. 5, 5ª and 5ᵇ in that the rear and forward faces of the bit shown in Figs. 1, 4 and 4ª are flattened as at 11 Fig. 4ª, while the bit shown in Fig. 5 has the narrow sides thereof flattened as at 12.

Figs. 15, 15ª and 15ᵇ show a center bit of somewhat conical formation, the portion 13 between the shank 6 and the upper or cutting end being conical, the larger and upper end of this conical part being beveled upon opposite sides as at 14. A groove 15 is formed across the center of the upper end of the bit in a direction at right angles to the direction of the bevel thus dividing the cutting end of said bit into two substantially chisel shaped cutters, the said groove 15 extends longitudinally on opposite sides of the bit, the lower ends of the grooves 15 joining grooves 15ª in the shank 6, whereby fluid from a hollow tool can pass to the inner faces of the cutting edges, while longitudinal grooves 16, formed in the bit in a vertical plane containing the axis and at right angles to the plane passing through the grooves 15, communicate with the outer faces of the cutter, and allow the fluid to have access thereto. Pins, keys or the like may be driven into suitable perforations formed in the parts for securely coupling the center bit to the head and the latter to the tool bar. For example key slots 1ᵇ Fig. 9 may be formed in the head and a slot 1ᶜ for a driver or releasing wedge may also be formed. All tapers used are preferably of the Morse variety. In some cases it may be desirable for the center bit to have the same number of sides and cutting edges as the number of wings or cutting edges possessed by the boring head. Such a construction is shown in Fig. 9 in which the boring head is formed with four radial wings 2 having at their upper ends cutting edges 4, and the center bit is formed with four quadrangular sides 17 increasing in width from their lower to their upper ends these sides 17 being preferably hollowed out as at 19 Figs. 9 and 11. The upper end of this bit is formed as a pyramid having four faces 18, a central point being thereby formed, where the said faces meet at the center of the bit. Obviously the center bit may be arranged so that its cutting edges are opposite, or in alinement with respective cutting edges on the head.

If desired the side faces of the center bit may be flat and not hollowed or grooved, the shank 6 only being grooved for the passage of fluid.

By forming the head tapered from the cutting end toward the rear, the tool is enabled to work easily even when the head penetrates a considerable distance into the rock. After a tapered head having for example a cutting end two inches and seven-eighths across or in diameter has been used on a bar of, say, two feet in length, it may be knocked off and re-sharpened, if necessary, and owing to the wear and tear and the sharpening, the length of the head will be reduced so that the cutting end is then only say two and three-quarter inches across or thereabout in diameter. The head may now be used upon a bar say four feet in length and after becoming further worn and after being re-sharpened the cutting end will be reduced still further, for example to two inches and five-eighths or approximately so across, or in diameter, when it could be used upon a bar say six feet in length, and so on. The rear end of any cutting head may be formed with a tapered socket or may be adapted for being secured to the bar by pinning, keying or screwing as will be readily understood.

The use of the center bit or point enables the head to produce a hole having a diameter corresponding with or very little greater than the diameter of, or maximum distances across, the cutting end of the head, and nevertheless the head will work easily and freely in such hole as the true direction thereof is preserved owing to the action of the center bit which, while preserving the true alinement, also relieves a portion of the stress on the boring or cutting head owing to the fact that the cutting area of such head is reduced.

The center bit when worn or damaged can be replaced without much loss of time and at very little expense and the removal of the center bit can be facilitated by forming therein a transverse slot for the reception of a suitable prizing tool or the like. The refettling and re-sharpening of the head is also accomplished in a simple manner and at very little expense and a great saving is thus effected when the repairing of the improved tool is compared with the repairing of long bar tools as at present used, because the latter involve much loss of time and labor in carrying them to the forge to be re-fettled and are difficult to handle during the operation of re-fettling and re-sharpening them. The tools hereinbefore described are primarily intended for use in percussive or hammer drills, but in order to further enhance the general utility of the improved tools, both the center bit and the head may be so fashioned that they may be used for a rotary drill. For this purpose both the center bit and cutting head may have a spiral or helical formation or may be constructed as shown in Figs. 12 to 14 in which the tubular head 1 is formed with helical wings 20 the upper ends of which are so shaped as to present radial chisel-shaped cutting edges 21, and the center bit is preferably formed with four cutting wings 22 the forward or leading faces of which are radial while the rear or following faces are helically curved. The spiral or helical devices of the head 1 may be continued along the tool bars or rods, and for exceptional depths any number of these tool bars or rods may be connected together by means of internally tapered and pinned, keyed or screwed sockets or other suitable sleeves, sockets or coupling devices. The sleeves or sockets preferably have a helical formation externally to continue the ejecting action of the other helical parts above described. The sleeves, sockets or coupling devices may have any suitable cross section and the parts are secured together by pins, keys, or the like. The center bits shown in the drawings are not necessarily for use only with the boring heads in connection with which they are shown, as different forms of center bit may be used with the same head.

I claim:—

1. Drills, bits and the like for boring in earth, rock and the like, comprising in combination a tubular boring head, a plurality of longitudinally disposed projections on said head, a plurality of cutting edges formed on one end of said head and along the ends of said projections, a center bit, and a tapered shank on said bit adapted to be driven into the cutting end of said tubular head, said shank being formed with axially directed recesses adapted to communicate between the interior of the tubular head and the atmosphere when said bit is in position substantially as and for the purpose set forth.

2. Drills, bits and the like for boring in earth, rock and the like, comprising in combination a tubular boring head, a plurality of longitudinally disposed projections on said head, a plurality of cutting edges formed on one end of said head and along the ends of said projections, a center bit, a shank thereon adapted to be secured in the cutting end of said tubular head, said shank being formed with recesses extending into the faces of the bit, said recesses being adapted to communicate with the interior of the tubular head and the atmosphere when said bit is in position substantially as set forth.

WILLIAM HENRY WAKFER.

Witnesses:
 EDITH WILSON,
 P. PHILLIPS.